Nov. 14, 1967  R. A. MOWREY  3,352,050
BAIT CASTER
Filed Dec. 19, 1966  2 Sheets-Sheet 1
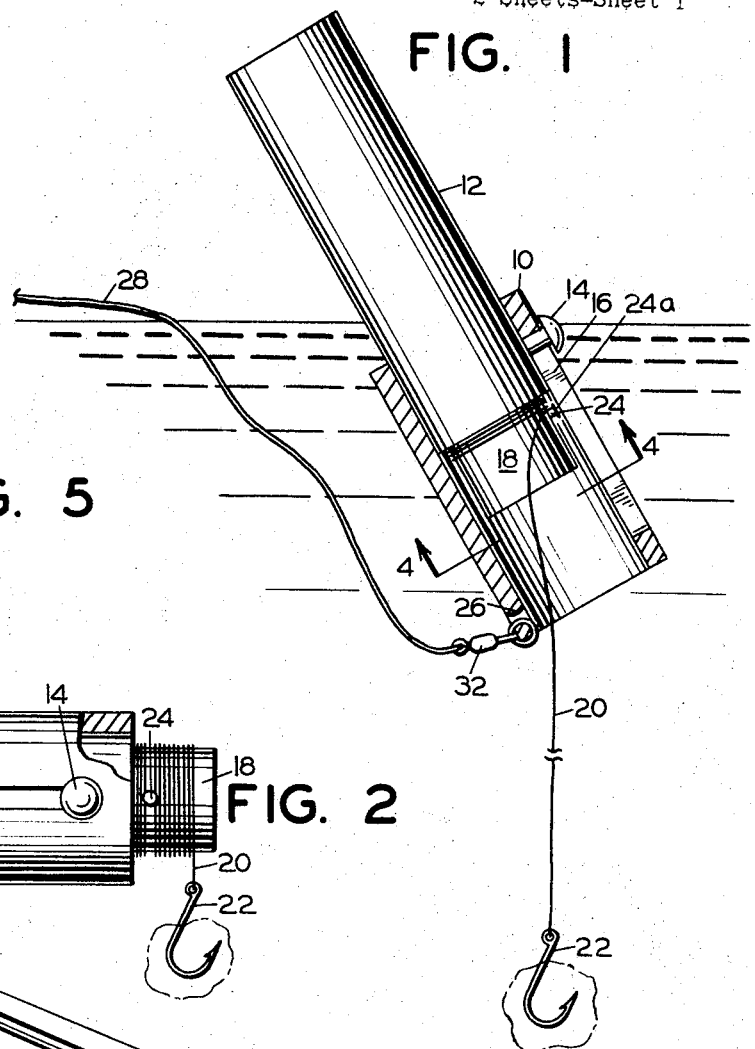
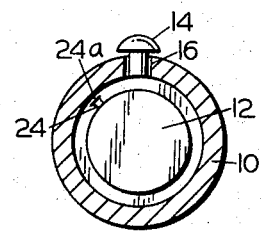
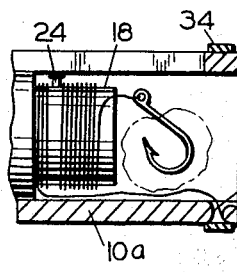
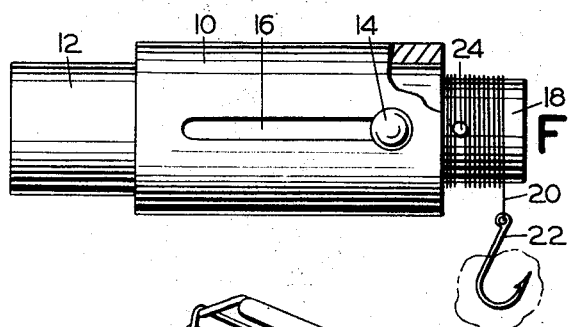
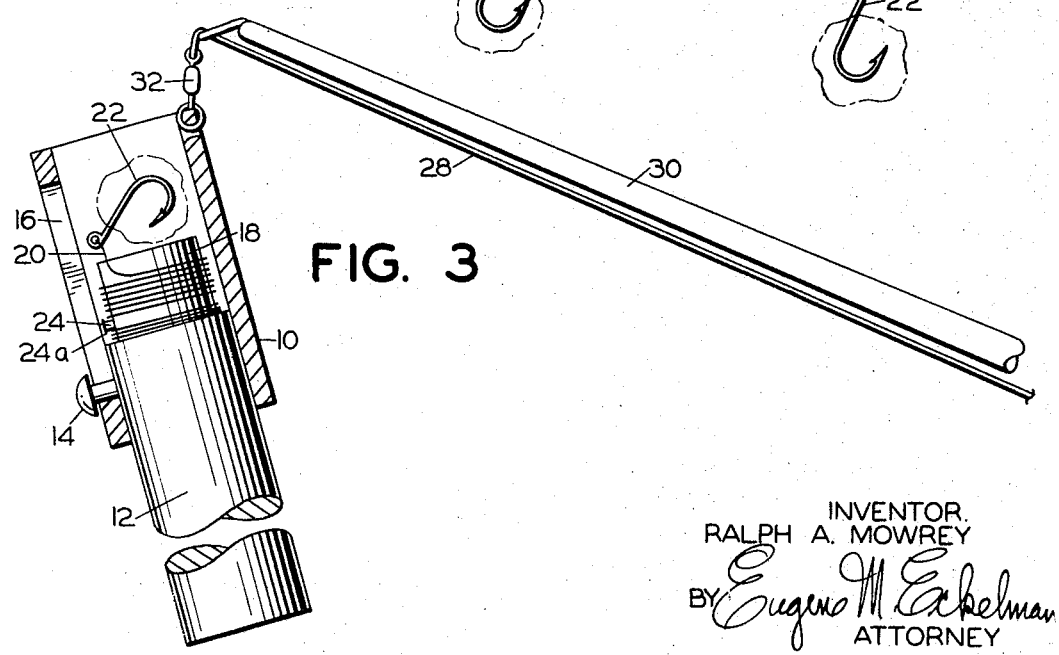
INVENTOR.
RALPH A. MOWREY
BY Eugene M. Eckelman
ATTORNEY

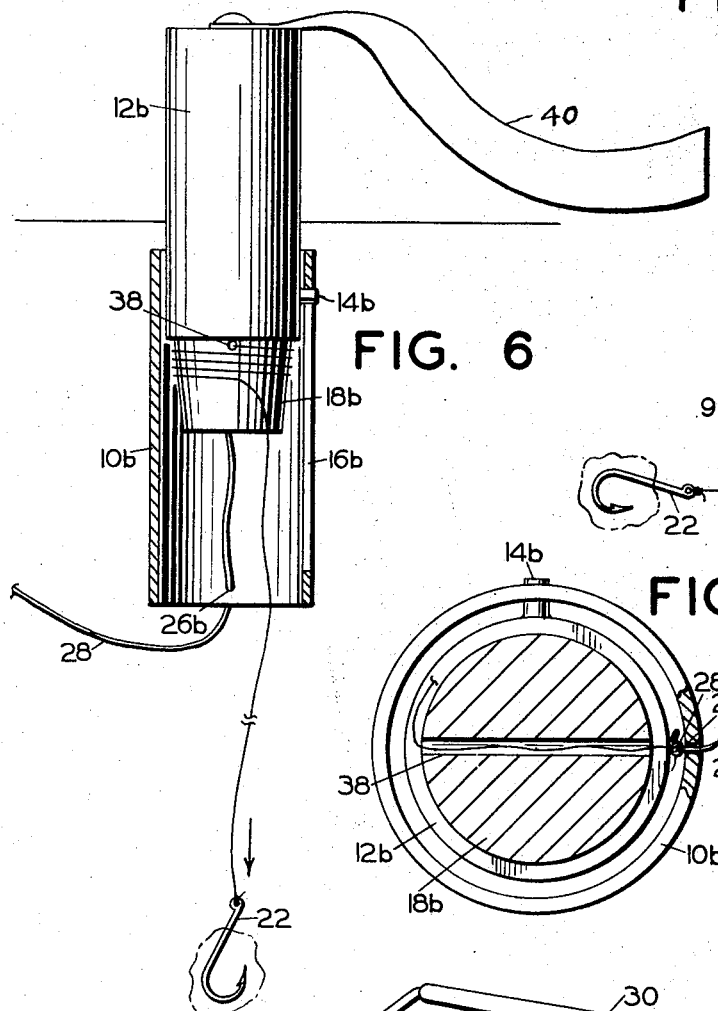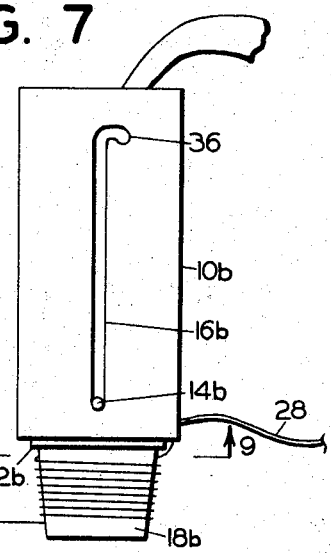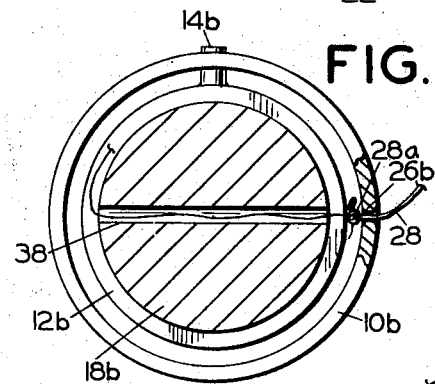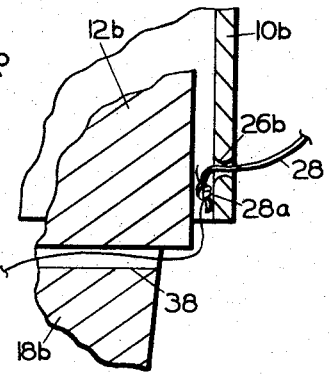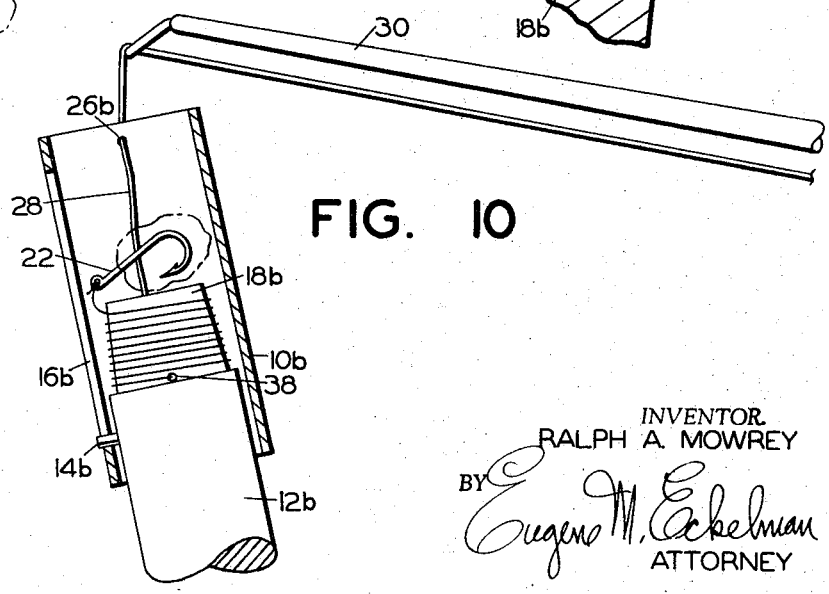

United States Patent Office 3,352,050
Patented Nov. 14, 1967

3,352,050
BAIT CASTER
Ralph A. Mowrey, 2008 SE. 8th Ave.,
Camas, Wash. 98607
Filed Dec. 19, 1966, Ser. No. 602,929
10 Claims. (Cl. 43—41.2)

This application is a continuation-in-part of now abandoned application Ser. No. 450,313, filed Apr. 23, 1965, for Bait Caster.

This invention relates to a new and novel bait caster.

A primary objective of the present invention is to provide an improved bait casting device employing novel means for confining the hook and bait as well as a portion of the line while a cast is being made and which is arranged to permit the hook and a portion of the line to unwind freely by gravity when the device has been cast in the desired place in the water.

A more particular object is to provide a bait casting device which utilizes a pair of telescoping members the inner member of which has a winding drum portion adapted to be confined within the outer member for holding a hook and bait in a concealed position.

Another object is to provide a device of the type described which employs telescoping members arranged to hold a hook and bait within an outer member and wherein said outer member has an open outlet end which permits positive and free release of fish line removably attached to a portion of an inner member.

Still another object is to provide a bait casting device of a structure adapted to conceal a portion of the fish line and hook for casting and which has means for conveniently adjusting the length of hook line to be released.

Still another object is to provide a bait casting device which also serves as a float or bobber after the cast has been made.

Additional objects will become apparent from the following specification and claims, considered together with the accompanying drawings, wherein the numerals of reference indicate like parts.

In the drawings:

FIGURE 1 is a longitudinal sectional view of a first embodiment of a bait casting device of the present invention, the device being shown in the water after the cast has been made;

FIGURE 2 is a side elevational view of the embodiment of FIGURE 1 with the parts thereof in a position for winding up a hook line to prepare for a cast;

FIGURE 3 is a longitudinal sectional view of the embodiment of FIGURE 1 but showing the parts arranged for casting;

FIGURE 4 is a cross sectional view taken on the line 4—4 of FIGURE 1;

FIGURE 5 is a fragmentary longitudinal sectional view showing a second embodiment of the invention;

FIGURE 6 is a longitudinal sectional view of a third embodiment in position in the water after the cast has been made;

FIGURE 7 is a side elevational view of the FIGURE 6 embodiment with the parts thereof in a position for winding up a hook line to prepare for a cast;

FIGURE 8 is an enlarged, fragmentary sectional view showing a means of connecting fish line to the bait caster;

FIGURE 9 is a cross sectional view taken on the line 9—9 of FIGURE 7; and

FIGURE 10 is a longitudinal sectional view similar to FIGURE 6 but showing the parts positioned for casting.

Referring now in particular to the drawings, and first to FIGURES 1-4, a first form of the bait casting device comprises essentially a pair of telescoping members, including an outer tubular member or housing 10 and an inner plunger 12. The internal diameter of the housing 10 and the external diameter of the plunger 12 are of selected dimension so as to provide a free sliding or telescoping connection between the parts, it being noted in FIGURE 2 that the length of the plunger 12 is greater than the housing 10 whereby as will be seen a forward portion of the plunger is adapted to project through the open end of the housing. The telescoping movement of the housing 10 and plunger 12 is controlled by a headed pin 14 on the plunger which is engaged in a longitudinal slot 16 in the housing, the slot 16 being of a length and the pin being selectively located such that in a fully retracted or rearward position of the plunger the forward end thereof is disposed interiorly of the housing but in a fully projected or forward position the front end of the plunger projects from the front end of the housing.

A forward portion 18 of the plunger is of reduced diameter and forms a winding drum around which a hook line or leader 20 for a hook 22 may be wound. In the embodiment of FIGURES 1-4, the free end of the leader 20 is tied to the drum. When it is desired that the line 20 and hook 22 be confined interiorly of the housing 10, as will be described hereinafter, the line 20 is wound around the drum, the said drum being of a sufficiently reduced diameter relative to the inner diameter of the housing as to permit slidable movement of the parts when line is wound on the drum.

Projecting from the surface of the drum 18 and located between the forward and rearward ends thereof is a pin 24 which serves to control the length of leader that it is desired to let out from the device after it has been cast. That is, the length of leader which it is desired to let out is that portion which is wound on the drum in front of the pin 24. Any portion wound behind the pin will not unwind when the device is in the water. Thus, the length of leader to be used is easily adjusted by the wrapped condition thereof on the drum 18 with relation to the pin 24.

The housing 10 has a bore 26 in its wall adjacent the open end thereof by means of which the end of a fish line 28 from a fish pole 30, FIGURE 3, may be tied, a swivel 32 preferably being connected between the housing 10 and the line 28.

In operation of the device, the plunger 12 is first moved to its forward position, FIGURE 2, wherein the drum portion 18 projects beyond the forward open end of the housing. The leader 20, after first being permanently tied to the drum back of the pin 24, is wrapped around the drum to bring the hook up close to the end of the plunger as in FIGURE 2. As will be apparent, the length of leader which it is desired to let out from the device after the cast has been made will be determined by the portion wrapped forwardly of the pin 24. Any portion wrapped rearwardly of the pin will not unwrap when the device is in the water, and to insure that such wrappings will stay behind the pin, said pin has a head portion 24a.

Thereupon the plunger 12 is drawn rearwardly to confine the drum 18 as well as the hook interiorly of the housing, as shown in FIGURE 3. The device is then in a position for casting. After it has been cast into the water, the device assumes the position of FIGURE 1 and the portion of the leader which has been wrapped forwardly of the pin 24 unwinds freely through the open end of the housing and sinks by gravity into the water. In order to insure that the device will assume an upright position or at least an upwardly inclined position, the housing 10 is constructed of a somewhat heavier material than the plunger 12, although it is to be understood that the device in its overall construction is buoyant. As an example, the housing 10 may be constructed of a plastic which has some buoyancy and the plunger 12 may be constructed of wood, or the plunger 12 may be hollow to establish its buoyancy. Therefore, since the housing 10 is of less buoyancy than the plunger 12 the device will float in the water in the upwardly inclined position shown in FIGURE 1 to insure unwrapping of the line 20 from the drum 18. The device will also serve as a float or bobber after the cast has been made.

FIGURE 5 shows a somewhat modified form of the device. In this form, a housing 10a similarly has a bore 26a adjacent its open end, and instead of tying the fish line to the housing, said fish line 28 passes freely through the bore 26a and is wrapped around the drum 18 of the plunger behind the pin 24. In this embodiment, no part of the line is tied to the drum, but as stated, the fish line is merely wrapped around the drum to establish the connection between the fish pole line and the casting device. The amount of hook line or leader 28 which it is desired to project from the housing after the cast has been made is determined by the amount wound on the drum ahead of the pin 24.

Also in the FIGURE 5 embodiment, means may be provided to restrain free movement of the fish line 28 through the bore 26a. Such is accomplished by a resilient band 34 stretched around the housing 10a in the plane of the bore 26a and arranged to compress the line 28 against the housing sufficiently to permit slidable movement but not free slidable movement. The band 34 may secure itself on the housing by its own frictional grip, but to insure a positive mounting thereon it may be glued or otherwise secured.

The purpose of the band 34 is to restrict the free movement of the line 28 sufficiently such that the bait caster will not move along the line after the line has been unwound from the drum 18. Obviously, there can be no relative axial movement of the bait caster and the line when the line is wound on the drum, but after the cast has been made it is desirable that connection be made, namely by the band 34, to prevent such relative axial movement, except when pulled in or out manually, particularly when no line is wound behind the pin 24 and said line extends freely past the drum after having unwound therefrom subsequent to a cast. With the embodiment of FIGURE 5, it is clear that a pin 24 need not be provided as a part of the drum but may be omitted altogether.

FIGURES 6-10 show still another form of the device. In this device there is similarly a housing 10b and a plunger 12b slidably mounted therein. The telescoping movement of the housing 10b and plunger 12b is controlled by a pin 14b on the plunger which is engaged in a longitudinal slot 16b in the housing. In this embodiment, one end of the slot 16b has a bayonet-type slot extension 36 in which the pin 14b is adapted to be received in the open position of the parts by slightly rotating the latter relative to each other. By means of this structure, the parts may be locked together in the casting condition and readily unlocked when it is desired to slide the plunger forwardly for winding on the line.

In the embodiment of FIGURE 6, the housing 10b has an aperture 26b to receive the fish line 28, and furthermore the drum portion 18b has a diametral bore 38 which also receives the line. Thus, in preparing the device for casting, the parts 10b and 12b are first telescoped together to the position of FIGURE 7 and the line wrapped on the drum portion 18b after having been pulled a selected distance through the aperture 26b and bore 38 depending upon the selected length desired for the line portion leading off the drum. Once the line is wrapped around the drum it is held against slippage, relative to the device. The parts are then moved apart as in FIGURE 10 for casting.

To positively anchor the line against slippage through the device, a knot 28a may be tied therein, FIGURES 8 and 9, and for this purpose it is desired that the apertures 26b be small enough so that an ordinary knot will suffice. Ordinarily, the knot 28a will comprise the connection between the line and leader. Not only does the knot 28a prevent slippage of the line through the device in the one direction but also the device cannot be lost if the hook gets snagged and the leader breaks, it being assumed of course that the leader is of less strength than the fish line.

The operation of the FIGURE 6 embodiment is the same as the FIGURE 5 embodiment with the exception that the parts 10b and 12b are locked together in the casting position. Drum 18 is tapered to the front thereof to cause the line to fall off readily.

The end of the plunger 12b opposite from the drum end has a flexible tail or flap 40 secured thereon. This tail stabilizes the bait caster in flight.

In accordance with the principles of the present invention a casting device has a construction providing for concealment of the hook and bait at the time the cast is being made and providing for free release of the hook line after the cast is completed. Such is accomplished by the open ended structure of the housing, the drum winding of the hook line, and the specific gravity arrangement of the parts wherein the device will float in a substantially upright position.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A bait casting device comprising a tubular housing open at its forward and rearward ends, a plunger slidably mounted in said housing, said plunger having a forward end arranged to receive fish line in wrapped relation thereon, said plunger having a slidable connection with said housing whereby to project forwardly out of the housing and to be retracted sufficiently to confine the forward end of the plunger interiorly of said housing while the device is being cast, said slidable connection including means for stopping said plunger in its most retracted position with its forward extremity spaced inwardly from the forward end of said housing to provide a space in said housing for receiving a baited fish hook secured to said line.

2. The bait casting device of claim 1 wherein the forward end of said plunger is reduced in diameter to receive said fish line wrappings thereon.

3. The bait casting device of claim 1 wherein the forward end of said plunger is reduced in diameter to receive said fish line wrappings thereon, and a projection on the surface of said forward end of the plunger for wrapping excess line therebehind.

4. The bait casting device of claim 1 wherein said stop means is on said housing and plunger and also limits the forward position of the plunger.

5. The bait casting device of claim 1 wherein said device in its overall construction is buoyant.

6. The bait casting device of claim 1 wherein said plunger is of greater length than said housing and in its retracted position projects rearwardly from said housing, said housing being of less buoyancy than said plunger whereby the device will float in water in an upright position with the forward end of said plunger directed downwardly.

7. The bait casting device of claim 1 wherein said housing has means adjacent its forward end for connection to a fish pole line 8. The bait casting device of claim 1 wherein said housing has an aperture at the forward end thereof for receiving a fish pole line and said plunger has a cross bore also for receiving the line.

9. The bait casting device of claim 1 wherein said housing has an aperture at the forward end thereof for receiving a fish pole line therethrough to be wrapped around the forward end of said plunger, and including resilient means secured to said housing in the plane of said aperture and arranged frictionally to restrict free movement of said line through said aperture.

10. The bait casting device of claim 1 including a flexible flap connected to the rearward end of said device for stabilizing the device when being cast.

References Cited

UNITED STATES PATENTS

| | | | |
|---|---|---|---|
| 2,744,353 | 5/1956 | Adams | 43—54.5 |
| 2,910,798 | 11/1959 | Bias | 43—41.2 |
| 2,963,813 | 12/1960 | Graham | 43—43.11 |
| 3,208,182 | 9/1965 | Holthaus | 43—41.2 |
| 3,214,858 | 11/1965 | Louie | 43—41.2 |

SAMUEL KOREN, *Primary Examiner.*

WARNER H. CAMP, *Examiner.*